(12) United States Patent
Khizar et al.

(10) Patent No.: US 12,070,924 B2
(45) Date of Patent: Aug. 27, 2024

(54) APPLIANCE LINER HAVING NATURAL FIBERS

(71) Applicant: WHIRLPOOL CORPORATION, Benton Harbor, MI (US)

(72) Inventors: Muhammad Khizar, St. Joseph, MI (US); Vincent Csapos, Hamilton, MI (US); Mario Godinho, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 712 days.

(21) Appl. No.: 16/939,431

(22) Filed: Jul. 27, 2020

(65) Prior Publication Data
US 2022/0024192 A1    Jan. 27, 2022

(51) Int. Cl.
| | | |
|---|---|---|
| *B32B 27/20* | (2006.01) | |
| *B32B 27/08* | (2006.01) | |
| *B32B 27/30* | (2006.01) | |
| *B32B 27/32* | (2006.01) | |
| *B29C 48/00* | (2019.01) | |
| *B29K 105/00* | (2006.01) | |
| *B29K 311/00* | (2006.01) | |

(52) U.S. Cl.
CPC .............. *B32B 27/20* (2013.01); *B32B 27/08* (2013.01); *B32B 27/302* (2013.01); *B32B 27/308* (2013.01); *B32B 27/32* (2013.01); *B29C 48/022* (2019.02); *B29K 2023/06* (2013.01); *B29K 2105/0032* (2013.01); *B29K 2311/00* (2013.01); *B32B 2270/00* (2013.01); *B32B 2509/10* (2013.01)

(58) Field of Classification Search
None
See application file for complete search history.

(56) References Cited

U.S. PATENT DOCUMENTS

| | | |
|---|---|---|
| 1,849,369 A | 3/1932 | Frost |
| 1,921,576 A | 8/1933 | Muffly |
| 2,191,659 A | 2/1940 | Hintze |
| 2,432,042 A | 12/1947 | Richard |
| 2,451,884 A | 10/1948 | Stelzer |
| 2,729,863 A | 1/1956 | Kurtz |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,408,316 A | 10/1968 | Mueller et al. |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,670,521 A | 6/1972 | Dodge, III et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,330,310 A | 5/1982 | Tate, Jr. et al. |
| 4,396,362 A | 8/1983 | Thompson et al. |
| 4,529,368 A | 7/1985 | Makansi |
| 4,583,796 A | 4/1986 | Nakajima et al. |
| 4,681,788 A | 7/1987 | Barito et al. |
| 4,781,968 A | 11/1988 | Kellerman |
| 4,865,875 A | 9/1989 | Kellerman |
| 4,870,735 A | 10/1989 | Jahr et al. |
| 4,914,341 A | 4/1990 | Weaver et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |

(Continued)

FOREIGN PATENT DOCUMENTS

| | | |
|---|---|---|
| CA | 626838 A | 5/1961 |
| CN | 201748744 U | 2/2011 |

(Continued)

OTHER PUBLICATIONS

Cai et al., "Generation of Metal Nanoparticles By Laser Ablation of Microspheres," J. Aerosol Sci., vol. 29, No. 5/6 (1998), pp. 627-636.
Raszewski et al., "Methods For Producing Hollow Glass Microspheres," Powerpoint, cached from Google, Jul. 2009, 6 pages.

*Primary Examiner* — Sheeba Ahmed
(74) *Attorney, Agent, or Firm* — PRICE HENEVELD LLP (57) ABSTRACT

A household appliance liner includes a first polymeric capping layer and a polymeric base layer. The first polymeric capping layer includes a first pigment additive. The polymeric base layer is coupled to the first polymeric capping layer. The polymeric base layer includes one or more polymers, a second pigment additive, and a natural fiber. The natural fiber can be present at a concentration of at least 50% by weight of the polymeric base layer. Methods of producing the household appliance liner are also disclosed.

18 Claims, 5 Drawing Sheets

(56) References Cited

U.S. PATENT DOCUMENTS

| | | |
|---|---|---|
| 5,168,674 A | 12/1992 | Molthen |
| 5,171,346 A | 12/1992 | Hallett |
| 5,227,245 A | 7/1993 | Brands et al. |
| 5,251,455 A | 10/1993 | Cur et al. |
| 5,269,601 A | 12/1993 | Williams et al. |
| 5,375,428 A | 12/1994 | LeClear et al. |
| 5,418,055 A | 5/1995 | Chen et al. |
| 5,500,287 A | 3/1996 | Henderson |
| 5,500,305 A | 3/1996 | Bridges et al. |
| 5,505,810 A | 4/1996 | Kirby et al. |
| 5,509,248 A | 4/1996 | Dellby et al. |
| 5,532,034 A | 7/1996 | Kirby et al. |
| 5,533,311 A | 7/1996 | Tirrell et al. |
| 5,545,450 A | 8/1996 | Andersen et al. |
| 5,599,081 A | 2/1997 | Revlett et al. |
| 5,600,966 A | 2/1997 | Valence et al. |
| 5,717,029 A | 2/1998 | Bonekamp et al. |
| 5,768,837 A | 6/1998 | Sjoholm |
| 5,792,801 A | 8/1998 | Tsuda et al. |
| 5,826,780 A | 10/1998 | Nesser et al. |
| 5,834,126 A | 11/1998 | Sheu |
| 5,866,247 A | 2/1999 | Klatt et al. |
| 5,918,478 A | 7/1999 | Bostic et al. |
| 5,950,395 A | 9/1999 | Takemasa et al. |
| 5,952,404 A | 9/1999 | Simpson et al. |
| 6,013,700 A | 1/2000 | Asano et al. |
| 6,063,471 A | 5/2000 | Dietrich et al. |
| 6,163,976 A | 12/2000 | Tada et al. |
| 6,164,739 A | 12/2000 | Schulz et al. |
| 6,187,256 B1 | 2/2001 | Aslan et al. |
| 6,209,342 B1 | 4/2001 | Banicevic et al. |
| 6,210,625 B1 | 4/2001 | Matsushita et al. |
| 6,244,458 B1 | 6/2001 | Frysinger et al. |
| 6,266,970 B1 | 7/2001 | Nam et al. |
| 6,294,595 B1 | 9/2001 | Tyagi et al. |
| 6,485,122 B2 | 1/2002 | Wolf et al. |
| 6,428,130 B1 | 8/2002 | Banicevic et al. |
| 6,430,780 B1 | 8/2002 | Kim et al. |
| 6,519,919 B1 | 2/2003 | Takenouchi et al. |
| 6,629,429 B1 | 10/2003 | Kawamura et al. |
| 6,655,766 B2 | 12/2003 | Hodges |
| 6,682,809 B2 | 1/2004 | Van Rheenen |
| 6,689,840 B1 | 2/2004 | Eustace et al. |
| 6,736,472 B2 | 5/2004 | Banicevic |
| 6,860,082 B1 | 3/2005 | Yamamoto et al. |
| 7,008,032 B2 | 3/2006 | Chekal et al. |
| 7,197,792 B2 | 4/2007 | Moon |
| 7,197,888 B2 | 4/2007 | LeClear et al. |
| 7,207,181 B2 | 4/2007 | Murray et al. |
| 7,234,247 B2 | 6/2007 | Maguire |
| 7,263,744 B2 | 9/2007 | Kim et al. |
| 7,360,371 B2 | 4/2008 | Feinauer et al. |
| 7,475,562 B2 | 1/2009 | Jackovin |
| 7,479,322 B2 | 1/2009 | Koeniger et al. |
| 7,517,031 B2 | 4/2009 | Laible |
| 7,614,244 B2 | 11/2009 | Venkatakrishnan et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,794,805 B2 | 9/2010 | Aumaugher et al. |
| 7,845,745 B2 | 12/2010 | Gorz et al. |
| 7,938,148 B2 | 5/2011 | Carlier et al. |
| 7,992,257 B2 | 8/2011 | Kim |
| 8,034,441 B2 | 10/2011 | Lefebvre et al. |
| 8,049,518 B2 | 11/2011 | Wern et al. |
| 8,074,469 B2 | 12/2011 | Hamel et al. |
| 8,076,000 B2 | 12/2011 | Domine |
| 8,079,652 B2 | 12/2011 | Laible et al. |
| 8,108,972 B2 | 2/2012 | Bae et al. |
| 8,157,338 B2 | 4/2012 | Seo et al. |
| 8,162,415 B2 | 4/2012 | Hagele et al. |
| 8,182,051 B2 | 5/2012 | Laible et al. |
| 8,197,019 B2 | 6/2012 | Kim |
| 8,266,923 B2 | 9/2012 | Bauer et al. |
| 8,382,219 B2 | 2/2013 | Hottmann et al. |
| 8,434,317 B2 | 5/2013 | Besore |
| 8,439,460 B2 | 5/2013 | Laible et al. |
| 8,491,070 B2 | 7/2013 | Davis et al. |
| 8,516,845 B2 | 8/2013 | Wuesthoff et al. |
| 8,551,279 B2 | 10/2013 | Johnson et al. |
| 8,590,992 B2 | 11/2013 | Lim et al. |
| 8,658,716 B2 | 2/2014 | Lacock et al. |
| 8,717,029 B2 | 5/2014 | Chae et al. |
| 8,752,921 B2 | 6/2014 | Gorz et al. |
| 8,763,847 B2 | 7/2014 | Mortarotti |
| 8,764,133 B2 | 7/2014 | Park et al. |
| 8,776,390 B2 | 7/2014 | Hanaoka et al. |
| 8,840,204 B2 | 9/2014 | Bauer et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 9,987,820 B2 | 6/2018 | Mehlmann et al. |
| 10,352,613 B2 | 7/2019 | Buzzi et al. |
| 2002/0004111 A1 | 1/2002 | Matsubara et al. |
| 2002/0025420 A1* | 2/2002 | Wanat ............... B32B 27/08 156/244.11 |
| 2002/0114937 A1 | 8/2002 | Albert et al. |
| 2002/0144482 A1 | 10/2002 | Henson et al. |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0226141 A1 | 11/2004 | Yates et al. |
| 2005/0042247 A1 | 2/2005 | Gomoll et al. |
| 2005/0229614 A1 | 10/2005 | Ansted |
| 2006/0064846 A1 | 3/2006 | Espendola et al. |
| 2006/0261718 A1 | 11/2006 | Miseki et al. |
| 2006/0266075 A1 | 11/2006 | Itsuki et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |

(56) References Cited

U.S. PATENT DOCUMENTS

| | | |
|---|---|---|
| 2008/0196441 A1 | 8/2008 | Ferreira |
| 2009/0032541 A1 | 2/2009 | Rogala et al. |
| 2009/0131571 A1 | 5/2009 | Fraser et al. |
| 2009/0205357 A1 | 8/2009 | Lim et al. |
| 2009/0246501 A1 | 10/2009 | Schuler et al. |
| 2009/0302728 A1 | 12/2009 | Rotter et al. |
| 2009/0322470 A1 | 12/2009 | Yoo et al. |
| 2010/0206464 A1 | 8/2010 | Heo et al. |
| 2010/0218543 A1 | 9/2010 | Duchame |
| 2010/0287843 A1 | 11/2010 | Oh |
| 2010/0287974 A1 | 11/2010 | Cur et al. |
| 2011/0011119 A1 | 1/2011 | Kuehl et al. |
| 2011/0023527 A1 | 2/2011 | Kwon et al. |
| 2011/0095669 A1 | 4/2011 | Moon et al. |
| 2011/0215694 A1 | 9/2011 | Fink et al. |
| 2011/0220662 A1 | 9/2011 | Kim et al. |
| 2011/0274900 A1 | 11/2011 | Megally et al. |
| 2011/0309732 A1 | 12/2011 | Horil et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0187019 A1 | 7/2012 | Tippet et al. |
| 2012/0240612 A1 | 9/2012 | Wusthoff et al. |
| 2012/0280608 A1 | 11/2012 | Park et al. |
| 2012/0315448 A1 | 12/2012 | Navez et al. |
| 2013/0026900 A1 | 1/2013 | Oh et al. |
| 2013/0043780 A1 | 2/2013 | Ootsuka et al. |
| 2013/0221819 A1 | 8/2013 | Wing |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0166926 A1 | 6/2014 | Lee et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0299611 A1 | 10/2014 | Gultekin et al. |
| 2014/0346942 A1 | 11/2014 | Kim et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0059399 A1 | 3/2015 | Hwang et al. |
| 2015/0115790 A1 | 4/2015 | Ogg |
| 2015/0159936 A1 | 6/2015 | Oh et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0283795 A1 | 10/2015 | Kim et al. |
| 2015/0285551 A1 | 10/2015 | Aiken et al. |
| 2016/0075866 A1* | 3/2016 | Kahn ................ B29C 65/48 156/60 |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1 | 9/2016 | Allard et al. |
| 2016/0281959 A1 | 9/2016 | Khizar et al. |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |
| 2018/0156533 A1 | 6/2018 | Buzzi et al. |
| 2019/0299511 A1 | 10/2019 | Khizar et al. |
| 2019/0390893 A1* | 12/2019 | Csapos ............... B32B 27/32 |

FOREIGN PATENT DOCUMENTS

| | | |
|---|---|---|
| CN | 102153829 A | 8/2011 |
| CN | 102645071 A | 8/2012 |
| CN | 102717578 A | 10/2012 |
| CN | 202973713 U | 6/2013 |
| CN | 103407228 A | 11/2013 |
| CN | 104816478 A | 8/2015 |
| CN | 105115221 | 12/2015 |
| CN | 2014963379 U | 1/2016 |
| DE | 4110292 A1 | 10/1992 |
| DE | 4409091 | 9/1995 |
| DE | 19914105 | 9/2000 |
| DE | 102011051178 A1 | 12/2012 |
| DE | 102011106883 A1 | 1/2013 |
| EP | 0645576 A1 | 3/1995 |
| EP | 1602425 A1 | 12/2005 |
| EP | 1624263 A2 | 8/2006 |
| EP | 1427627 B1 | 11/2007 |
| EP | 2543942 A2 | 1/2013 |
| EP | 2878427 A1 | 6/2015 |
| FR | 2991698 A1 | 12/2013 |
| JP | 404165197 | 6/1992 |
| JP | 04165197 | 10/1992 |
| JP | 04309778 A | 11/1992 |
| JP | 11159693 A | 6/1999 |
| JP | 2000320958 A | 11/2000 |
| JP | 2002068853 | 3/2002 |
| JP | 3438948 | 8/2003 |
| JP | 2005069596 A | 3/2005 |
| JP | 2005098637 A | 4/2005 |
| JP | 2006161834 A | 6/2006 |
| JP | 2006200685 A | 8/2006 |
| JP | 2008190815 | 8/2008 |
| JP | 2013050267 A | 3/2013 |
| JP | 2013076471 A | 4/2013 |
| KR | 20050095357 A | 9/2005 |
| KR | 100620025 B1 | 9/2006 |
| KR | 1020070065743 A | 6/2007 |
| KR | 20090026045 | 3/2009 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9614207 A1 | 5/1996 |
| WO | 9721767 | 6/1997 |
| WO | 9920961 A1 | 4/1999 |
| WO | 9920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 2003022664 A1 | 3/2003 |
| WO | 03072684 A1 | 9/2003 |
| WO | 2004010042 A1 | 1/2004 |
| WO | 2006045694 | 5/2006 |
| WO | 2006073540 A2 | 7/2006 |

(56) References Cited

FOREIGN PATENT DOCUMENTS

| | | |
|---|---|---|
| WO | 2007033836 A1 | 3/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2010007783 A1 | 1/2010 |
| WO | 2010127947 A2 | 11/2010 |
| WO | 2011058678 A1 | 5/2011 |
| WO | 2012152646 | 11/2012 |
| WO | 2013116103 | 8/2013 |
| WO | 2013116302 | 8/2013 |
| WO | 2014038150 A1 | 3/2014 |
| WO | 2014121893 A1 | 8/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

\* cited by examiner

APPLIANCE LINER HAVING NATURAL FIBERS

FIELD OF THE DISCLOSURE

The present disclosure generally relates to liners for appliances. More specifically, the present disclosure generally relates to appliance liners having natural fibers.

BACKGROUND

This application relates to liners having particular colors, hues, tints, and the like which are desired for many appliance-related applications, such as refrigeration appliances. As appliance designers have recently placed more emphasis on interior design and lighting (e.g., given the lower energy usage of light-emitting diode (LED) sources), the importance of interior aesthetics has increased for many consumers. Similarly, appliance manufacturers often emphasize aesthetics, including interior design approaches, in attempting to obtain brand differentiation from their competitors.

Liners employed in appliances, including refrigeration appliances, are often produced with extrusion processes. As these liners often are fabricated from two or more layers, conventional approaches to adding color to these liners often involve adding pigments to each extruder employed in making a layer employed in the liner. As pigments are added to multiple extruders, the complexity, repeatability, and manufacturing cost of matching colors increases significantly for a liner that comprises two or more layers having pigments. Further, as significant loadings of pigments in these multi-layer liners are often employed, down-stream processes such as thermal forming used to incorporate the liners into an end product can lead to local discoloration and yield losses. Further, multiple and cost-intensive extrusion runs are often required to fabricate a liner having multiple, extruded layers with pigments that match a particular color, tint, or hue. Still further, these approaches for making a liner having multiple, extruded pigmented layers require one or more adhesives to bond the layers, which increases the cost and can decrease manufacturing yield.

Colored liners currently being utilized in appliances frequently present problems during manufacturing since these liners readily show scratches or defects in the liner surface where the pigment is incorporated. Such scratches imparted on the liner during either the manufacturing process or use by consumers can lead to premature wearing where the inside surface of the refrigeration appliance can look excessively worn or damaged. The flexibility and ability to produce liners where scratches are not readily shown would be beneficial to both manufactures and users for both the production process and downstream aesthetic appearances.

Accordingly, there is a need for methods of making liners, particularly pigmented liners for refrigeration appliances, which are repeatable, with high manufacturing flexibility, and low in cost. There is also a need for pigmented liners that do not readily show scratches or other wear marks that may be transferred to the liner surface during fabrication or consumer use.

SUMMARY OF THE DISCLOSURE

In at least one aspect of the present disclosure, a household appliance liner is provided. The household appliance liner includes a first polymeric capping layer and a polymeric base layer. The first polymeric capping layer includes a first pigment additive. The polymeric base layer is coupled to the first polymeric capping layer. The polymeric base layer includes one or more polymers, a second pigment additive, and a natural fiber. The natural fiber is present at a concentration of at least 50% by weight of the polymeric base layer.

According to another aspect of the present disclosure, a household appliance liner is provided. The household appliance liner includes a first polymeric capping layer and a polymeric base layer. The polymeric base layer is coupled to the first polymeric capping layer. The first polymeric capping layer includes a first pigment additive and a first polymeric capping layer precursor. The first pigment additive is present at a concentration of about 5% to about 30% by weight of the first polymeric capping layer. The first polymeric capping layer precursor is present at a concentration of about 70% to about 95% by weight of the first polymeric capping layer. The polymeric base layer includes one or more polymers, a second pigment additive, and a natural fiber. The second pigment additive is present in the polymeric base layer at a concentration of about 1% to about 30% by weight of the polymeric base layer. The natural fiber is present at a concentration of at least 50% by weight of the polymeric base layer.

According to yet another aspect of the present disclosure, a method of making a liner for a household appliance is provided. The method includes the step of mixing a first polymeric capping layer precursor and a first pigment additive to form a first polymeric capping layer. The first pigment additive is present at a concentration of about 5% to about 30% by weight of the first polymeric capping layer. The method also includes the step of mixing one or more polymers, a second pigment additive, and a natural fiber to form a polymeric base resin. The method further includes the step of extruding the polymeric base resin to form a polymeric base layer at a base layer formation temperature. The second pigment additive is present in the polymeric base layer at a concentration of about 1% to about 30% by weight of the polymeric base layer. The natural fiber is present at a concentration of at least 50% by weight of the polymeric base layer. The method also includes the step of laminating the polymeric base layer and the first polymeric capping layer to form the liner at about the base layer formation temperature.

These and other features, advantages, and objects of the present device will be further understood and appreciated by those skilled in the art upon studying the following specification, claims, and appended drawings.

BRIEF DESCRIPTION OF THE DRAWINGS

The foregoing summary, as well as the following detailed description of the device, will be better understood when read in conjunction with the appended drawings. For the purpose of illustrating the device, there are shown in the drawings, certain embodiment(s) that are presently preferred. It should be understood, however, that the device is not limited to the precise arrangements and instrumentalities shown. Drawings are not necessary to scale. Certain features of the device may be exaggerated in scale or shown in schematic form in the interest of clarity and conciseness.

In the drawings.

DETAILED DESCRIPTION

Before the subject device is described further, it is to be understood that the device is not limited to the particular embodiments of the device described below, as variations of the particular embodiments may be made and still fall within the scope of the appended claims. It is also to be understood that the terminology employed is for the purpose of describing particular embodiments or aspects of embodiments, and is not intended to be limiting. Instead, the scope of the present device will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the device. The upper and lower limits of these smaller ranges may independently be included in the smaller ranges, and are also encompassed within the device, subject to any specifically excluded limit in the stated range. Where the stated range includes one or both of the limits, ranges excluding either or both of those included limits are also included in the device.

In this specification and the appended claims, the singular forms "a," "an" and "the" include plural reference unless the context clearly dictates otherwise.

Referring to FIGS. 1-5, a liner 10 for a household appliance 14 and methods of making the same are disclosed. The liner 10 for the household appliance 14 includes a first polymeric capping layer 18 and a polymeric base layer 22. The first polymeric capping layer 18 includes a first pigment additive 26. The polymeric base layer 22 is coupled to the first polymeric capping layer 18. The polymeric base layer 22 includes one or more polymers 30, a second pigment additive 34, and a natural fiber 38. The natural fiber 38 may be present at a concentration of at least 50% by weight of the polymeric base layer 22. In various aspects, the liner 10 may include a barrier layer 42. In some aspects, a second polymeric capping layer 46 may be coupled to the first polymeric capping layer 18 such that the first polymeric capping layer 18 is positioned between the polymeric base layer 22 and the second polymeric capping layer 46.

Referring again to FIGS. 1-5, a method 200 of making the liner 10 for the household appliance 14 can include mixing a first polymeric capping layer precursor 50 and the first pigment additive 26 to form the first polymeric capping layer 18 (step 204). The first pigment additive 26 may be present at a concentration of about 5% to about 30% by weight of the first polymeric capping layer 18. The method 200 can include mixing the one or more polymers 30, the second pigment additive 34, and the natural fiber 38 to form a polymeric base resin 54. In various aspects, the first pigment additive 26 and the second pigment additive 34 may be identical. While the first pigment additive 26 and the second pigment additive 34 may be identical, the present disclosure may maintain the separate terminology of the pigment additive(s) in an effort to enhance clarity and aid in distinguishing a location of the given pigment additive (e.g., first polymeric capping layer 18 or polymeric base layer 22). The method 200 can include extruding the polymeric base resin 54 to form the polymeric base layer 22 at a base layer formation temperature (step 208). The second pigment additive 34 may be present in the polymeric base layer 22 at a concentration of about 1% to about 30% by weight of the polymeric base layer 22. The natural fiber 38 may be present at a concentration of at least 50% by weight of the polymeric base layer 22. The method 200 can include laminating the polymeric base layer 22 and the first polymeric capping layer 18 to form the liner 10 at about the base layer formation temperature (step 212). In various aspects, the method 200 may further include laminating the barrier layer 42 between the polymeric base layer 22 and the first polymeric capping layer 18 to form the liner 10 at about the base layer formation temperature. In some aspects, the method 200 may include extruding the second polymeric capping layer 46. In various aspects, the method 200 may include forming a textured pattern 58 on an outer surface 62 of the first polymeric capping layer 18 (step 216). The formed liner 10 includes a first capping region 66, an optional barrier region 70, and a base region 74. The first capping region 66 includes the first pigment additive 26. The base region 74 includes the first pigment additive 26 and/or the second pigment additive 34. In various aspects, the method 200 may include shaping the liner 10 into a final liner 78 at a shaping temperature where the final liner 78 is configured and/or is suitable for assembly into a refrigeration appliance (step 220).

Figure 1:
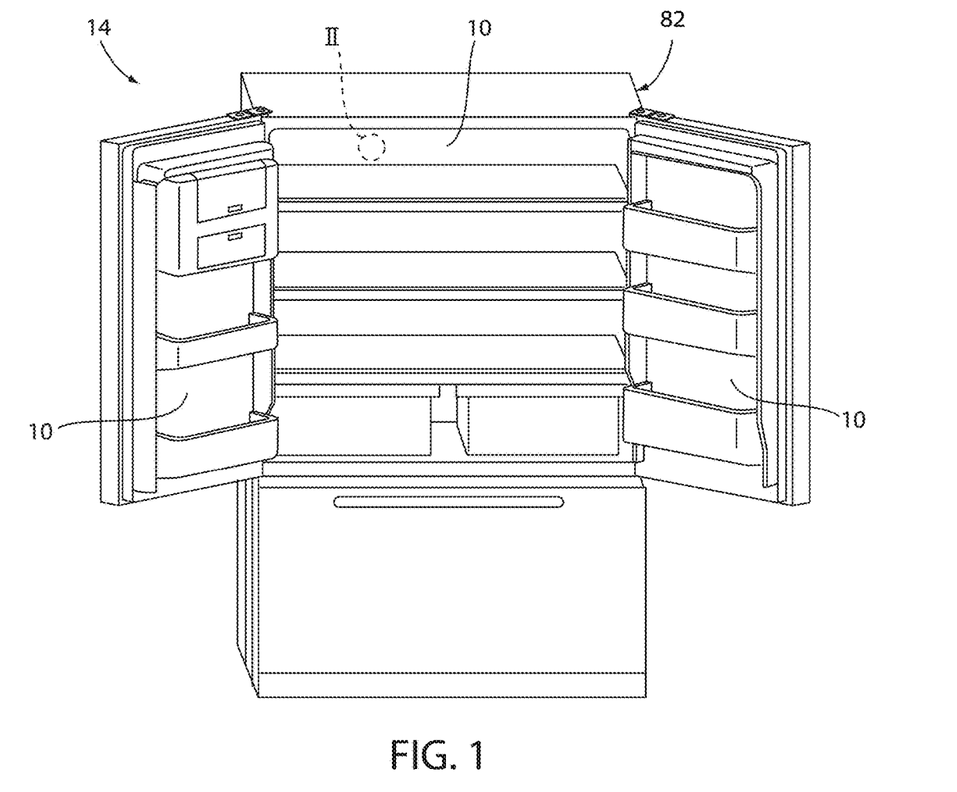
FIG. 1 is a schematic of a refrigeration appliance including a liner according to aspects of the present disclosure.

Referring now to FIG. 1, the household appliance 14 is provided in an exemplary form that includes the liner 10 according to some aspects. As shown, the liner 10 is mounted to a cabinet 82 of the household appliance 14. In some configurations, the liner 10 is mounted to a foam layer 86 (see FIGS. 2A-2D) installed on an interior surface of the cabinet 82. In other configurations, the liner 10 may be mounted directly to the cabinet 82. Typically, the liner 10 is attached, coupled, joined, or otherwise fastened to the cabinet 82 through the insulating foam 86, adhesive, bonding agent, mechanical fastener (e.g., rivets, screws, etc.), or another comparable approach. However, the liner 10 itself does not include any internal adhesives and, according to some aspects, includes one or more pigment additives (e.g., the first pigment additive 26) in the first polymeric capping layer 18 only (see FIGS. 2A-2B).

Referring to FIGS. 2A-2D, the liner 10 of the household appliance 14 includes the first polymeric capping layer 18 and the polymeric base layer 22. The first polymeric capping layer 18 includes the first pigment additive 26. The first pigment additive 26 may be present in the first polymeric capping layer 18 at a concentration of about 5% to about 30% by weight of the first polymeric capping layer 18. The first polymeric capping layer 18 can also include the first polymeric capping layer precursor 50, which will be discussed in further detail herein. The first polymeric capping layer precursor 50 can be present in the first polymeric capping layer 18 at a balancing concentration relative to the first pigment additive 26. For example, the first polymeric capping layer precursor 50 can be present in the first polymeric capping layer 18 at a concentration of about 70% to about 95% by weight of the first polymeric capping layer 18. The polymeric base layer 22 includes the one or more polymers 30, the second pigment additive 34, and the natural fiber 38. The one or more polymers 30 can be present in the polymeric base layer 22 at a concentration of 50% or less by weight of the polymeric base layer 22. For example, the one or more polymers 30 may be present in the polymeric base layer 22 at a concentration of 50% by weight, less than 50% by weight, about 45% by weight, about 40% by weight, about 35% by weight, about 30% by weight, about 25% by weight, about 20% by weight, about 15% by weight, about 10% by weight, about 5% by weight, greater than zero percent by weight, and/or combinations or ranges thereof. Discussion of the concentration of the one or more polymers 30 within the polymeric base layer 22 are intended to refer to a total or combined concentration of the one or more polymers 30 as opposed to individual concentrations of the one or more polymers 30. For example, a concentration of the one or more polymers 30 that is about 40% by weight of the polymeric base layer 22 may include about 20% by weight of Polymer A and about 20% by weight of Polymer B. The second pigment additive 34 can be present in the polymeric base layer 22 at a concentration of about 1% to about 30% by weight of the polymeric base layer 22. For example, the second pigment additive 34 can be present in the polymeric base layer 22 at a concentration of about 1% by weight, about 5% by weight, about 10% by weight, about 15% by weight, about 20% by weight, about 25% by weight, about 30% by weight, and/or combinations or ranges thereof. The natural fiber 38 can be present in the polymeric base layer 22 at a concentration of between 15% by weight of the polymeric base layer 22 and 65% by weight of the polymeric base layer 22. In various examples, the natural fiber 38 can be present in the polymeric base layer 22 at a concentration of about 15% by weight, about 20% by weight, about 30% by weight, about 35% by weight, about 40% by weight, about 45% by weight, about 50% by weight, about 55% by weight, about 60% by weight, about 65% by weight, and/or combinations or ranges thereof. In some examples, the liner 10 of the household appliance 14 may be provided with the barrier layer 42 and/or the second polymeric capping layer 46, as will be discussed in further detail herein. The various examples of the liner 10 disclosed herein are exemplary in nature. Accordingly, the characteristics of a given layer of the liner 10 discussed with regard to one example may be applicable in whole or in part to additional and/or alternative examples.

Figure 2A:
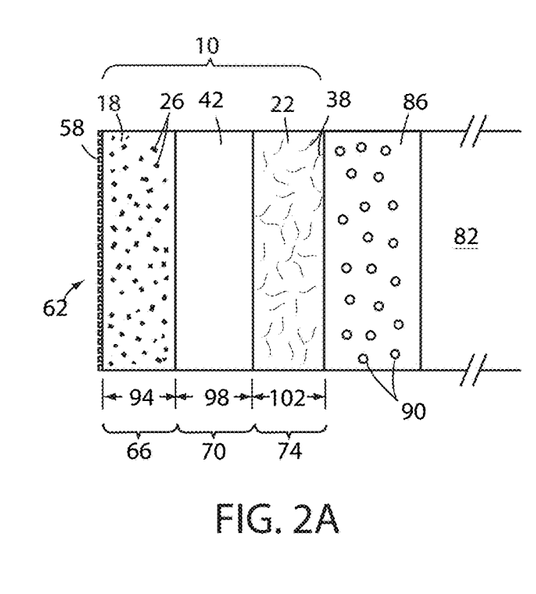
FIG. 2A is a schematic of an enlarged cross-section of the liner at region II marked in FIG. 1 including a first polymeric capping layer, a barrier layer, and a polymeric base layer, according to some aspects of the present disclosure.

Referring now to FIG. 2A, the liner 10 (e.g., as incorporated into the household appliance 14 depicted in FIG. 1) includes the first polymeric capping layer 18 and corresponding first capping region 66, the polymeric base layer 22 and corresponding base region 74, and the barrier layer 42 and corresponding barrier region 70. The liner 10 and its combination of the barrier layer 42 sandwiched between the first polymeric capping layer 18 and polymeric base layer 22 may be positioned directly onto the foam layer 86. In some aspects, the foam layer 86 may include closed-cell and/or open-cell voids, air bubbles, and/or pores 90 distributed evenly throughout the foam layer 86. In some aspects, the foam layer 86 imparts an insulation layer between the liner 10 and the wrapper and/or cabinet 82 of the household appliance 14. The first polymeric capping layer precursor 50 used to form the first polymeric capping layer 18 may include a high-impact polystyrene (HIPS), poly(methyl methacrylate) (PMMA), polystyrene (PS), acrylonitrile butadiene styrene (ABS), polyurethane (PU), polypropylene (PP), polyethylene (PE), or combinations thereof. In some aspects, the first polymeric capping layer precursor 50 selected for use in the first polymeric capping layer 18 may be any known thermoplastic known in the art suitable for use in an extrusion process. In other aspects, the first polymeric capping layer precursor used to form the first polymeric capping layer 18 may include a high-impact polystyrene precursor material (e.g., 1115 HIPS). As also depicted in FIG. 2A, the first polymeric capping layer 18 can be configured to have a thickness 94 (e.g., through extrusion, rolling, etc.) of about 0.10 mm to about 1.5 mm. In some aspects, the thickness 94 of the first polymeric capping layer 18 may range from about 0.25 mm to about 0.75 mm. Note that the thickness 94 of the first polymeric capping layer 18 is given in approximate dimensions, as would be typically associated with the first polymeric capping layer 18 being in a sheet or layer form before incorporation into the liner 10. The first pigment additive 26 may be incorporated and/or disbursed within the first polymeric capping layer 18 at a level sufficient to impart a desired color, hue, tinting, or the like in the liner 10.

Referring again to FIG. 2A, the textured pattern 58 may be positioned on the outer surface 62 of the first polymeric capping layer 18 of the liner 10. The textured or granular pattern 58 is beneficial for the color and aesthetic preservation of the liner 10 over time since the textured pattern 58 can help protect the first polymeric capping layer 18 from visibly showing scratches, rub marks, gouges, and/or scrapes. Additionally, when the textured pattern 58 is employed on the outer surface 62 of the first polymeric capping layer 18, the first pigment additive 26 may be spaced away from the outer surface 62 of the liner 10. The textured pattern 58 can provided wear resistance and prevent contact between the first pigment additive 26 and the user and/or potential food products stored in the household appliance 14. The textured pattern 58 may include a variety of different surface patterns formed on the first polymeric capping layer 18, for example, pyramidal, diamond, circular, trapezoidal, square, tetragonal, hexagonal, polygonal, or a combination of shapes thereof. In some aspects, the textured pattern 58 may include a 2D surface pattern, a 3D surface pattern, or a combination thereof. The textured or granular pattern 58 helps prevent visible markings or wear of the outer surface 62 of the liner 10 by offering an alternative to a glossy or smooth finished surface that can readily show marks or wear from the manufacturing process or normal wear. In some aspects, the textured or granular pattern 58 can absorb a scratch, scuff, and/or gouge while the textured pattern 58 can blend in or camouflage the respective mark. In some examples, the textured pattern 58 may be omitted such that the outer surface 62 is provided with a smooth appearance.

Referring further to FIG. 2A, the first polymeric capping layer 18 of the liner 10 may include one or more additives (e.g., first pigment additive 26), configured to impart color, tinting, or the like into the liner 10. As understood by those with ordinary skill in the field of the disclosure, various metallic, ceramic, and/or polymeric, pigments and/or colorants can be added at various concentrations within the first polymeric capping layer precursor 50 employed in the first polymeric capping layer 18 of the liner 10. In some aspects, the first pigment additive 26 is a granulated pigment. For example, titanium oxide can be included as the first pigment additive 26 to achieve a white color. In other aspects, the liner 10 having a charcoal-sparkle appearance can be created by employing carbon black in one or more of quartz, mica, and stainless steel as the first pigment additive 26. In some aspects of the disclosure, the first pigment additives 26 are incorporated into the first capping region 66 of the first polymeric capping layer 18 at a concentration level and disbursed to ensure that the liner 10 exhibits a particular color, hue, or the like, as desired by the user of the household appliance 14. In some aspects, no additional pigment additives are used, directly or indirectly transferred, and/or incorporated in the base region 74 of the polymeric base layer 22 to obtain the desired color, hue, or tinting for the liner 10. According to other aspects, the first pigment additive 26 may be incorporated into the first capping region 66 and the base region 74 at concentrations sufficient for the liner 10 to obtain the desired color, hue, or tinting. In such aspects, the second pigment additive 34 may be identical to the first pigment additive 26. In some aspects, the mixing step 204 includes mixing the first polymeric capping layer precursor 50 with about 5% to about 30% first pigment additive 26 by weight of the first polymeric capping layer 18. According to some aspects, the first pigment additives 26 are incorporated into the first capping region 66 of the first polymeric capping layer 18 at a concentration from about 10% to about 25% (by weight of the first polymeric capping layer 18). Optionally, the first pigment additives 26 may be incorporated into the first capping region 66 at a concentration from about 1% to about 10% (by weight of the first polymeric capping layer 18). In still other aspects, the concentration of the first pigment additive 26 in the first capping region 66 of the first polymeric capping layer 18 is loaded between about 15% to about 25% (by weight of the first polymeric capping layer 18) and in the base region 74 of the polymeric base layer 22, if present, from about 3% to about 5% (by weight of the base layer 22). In some aspects, the first polymeric capping layer comprises from about 70% to about 95% by weight first polymeric capping layer precursor 50 and from about 5% to about 30% first pigment additive 26 by weight.

Referring still further to FIG. 2A, the barrier layer 42 and corresponding barrier region 70 may help protect the liner 10 from wrinkling, deformations, and/or delamination effects caused during manufacturing or end use. In some aspects, the barrier layer 42 may prevent the diffusion of volatiles and other potential contaminants associated with injecting the foam 86 positioned between the liner 10 and the cabinet 82. In some aspects, the contaminants associated with the foam 86 that could discolor or lead to other deteriorating defects in the liner 10 have no negative effects on the first polymeric capping layer 18 disclosed herein. The barrier layer 42 may be sandwiched directly between the first polymeric capping layer 18 and polymeric base layer 22 to form the liner 10 with no additional adhesives and/or bonding agents used between the respective layers 18, 22, 42. In some aspects, the barrier region 70 includes a polyethylene material used in combination with a material employed in the base region 74, typically a material comparable to that employed in the first polymeric capping layer 18 or first capping region 66, e.g., a high-impact polystyrene (HIPS). In some aspects, the barrier layer 42 may be formed using a low density polyethylene, a high density polyethylene, a polypropylene, a polycarbonate, a polyester, a polyamide, a polystyrene, a high-impact polystyrene (HIPS), or a combination thereof. According to some aspects, additional compatibilizers, as understood by those with ordinary skill in the art, are added to the barrier region 70 to ensure that the polyethylene layers and HIPS material within the barrier region 70 are combined without the formation of voids, bubbles, delamination defects, etc. In some aspects, the barrier region 70 may include one or more barrier layers 42 comprising a polyethylene material, layered on the respective material of the base layer 22. As also depicted in FIG. 2A, the barrier region 70 of the barrier layer 42 can be configured with a thickness 98 (e.g., through extrusion, rolling, etc.) of about 0.10 mm to about 1.5 mm. In some aspects, the barrier layer 42 has a thickness 98 of about 0.25 mm to about 0.75 mm. Note that the thickness 98 of the barrier layer 42 is given in approximate dimensions, as would be typically associated with the barrier layer 42 being in a sheet or layer form before incorporation into the liner 10.

Referring again to FIG. 2A, the polymeric base layer 22 may provide structural support to the liner 10. The polymeric base resin 54 used to form the base region 74 of the polymeric base layer 22 may include a high-impact polystyrene (HIPS), poly(methyl methacrylate) (PMMA), polystyrene (PS), acrylonitrile butadiene styrene (ABS), polyurethane (PU), polypropylene (PP), polyethylene (PE), or combinations thereof. In some aspects, the polymeric base resin 54 selected for use in the base layer 22 are thermoplastics, suitable for use in an extrusion process. In other aspects, the polymeric base resin 54 (see FIGS. 4A and 4B) used to form the polymeric base layer 22 may include a high-impact polystyrene (1170 HIPS) precursor material. As also depicted in FIG. 2A, the base region 74 of the polymeric base layer 22 can be configured with a thickness 102 (e.g., through extrusion, rolling, etc.) of about 0.10 mm to about 1.5 mm. In some aspects, the polymeric base layer 22 has thickness 102 of about 0.25 mm to about 0.75 mm. Note that the thickness 102 of the base layer 22 is given in approximate dimensions, as would be typically associated with the polymeric base layer 22 being in a sheet or layer form before incorporation into the liner 10.

Referring further to FIG. 2A, the liner 10 is configured such that the first capping region 66, the barrier region 70, and the base region 74 (i.e., for liner 10) are joined with substantially no interfaces between them. The term "interface", as defined herein, is meant to include boundaries marked by structural defects such as cracks, folds, or bubbles where two layers (e.g. 18, 22, and 42) meet and interact. When layers made from different polymeric materials (e.g. 18, 22, and/or 42) are laminated together, the blending of the respective polymeric materials at the junction between the layers is not considered an "interface" because the boundary is not marked by one or more defects that may lead to a decrease in structural integrity. In some aspects, the liner 10, including the first capping region 66, the barrier region 70, and/or the base region 74 are joined with substantially no interfaces between the respective layers forming a uniform bilayer or trilayer with the appearance of a monolayer. That is, a cross-section of the liner 10 when viewed under low magnification will not reveal any indications of an interface or interfaces between the first capping region 66, the barrier region 70, and/or the base region 74. Advantageously, the lack of any appreciable interfaces between these two or three regions 66, 70, and/or 74 significantly reduces the likelihood that these regions 66, 70, and/or 74 will delaminate during subsequent processing (e.g., thermal-forming of the liner 10 into a refrigeration household appliance 14, such as depicted in FIG. 1) and other demands of the application environment of the liner 10. Another advantage of these liners 10 is that the base region 74, the barrier region 70, and/or the first capping region 66 for the liner 10 are configured with substantially no interfaces between them, thus eliminating the necessity of employing adhesives or other bonding agents to join them. As these implementations of the liner 10 do not require adhesives, they can be fabricated (e.g. through lamination processes) at a lower cost and using faster fabrication processes. Further, the lack of adhesives employed between these regions 66, 70, and/or 74 tends to result in improved color uniformity for these liners 10 in comparison to conventional, pigmented multi-layer liners with layers joined with internal adhesives. In some aspects, the interfaces between the barrier layer 42 and the base layer 22, the barrier layer 42 and the first polymeric capping layer 18, and/or between the base layer 22 and the first polymeric capping layer 18 include a polymer blend where the respective polymeric resins used in the respective layers flow and mix to form the corresponding polymer blends at the interface.

Figure 2B:
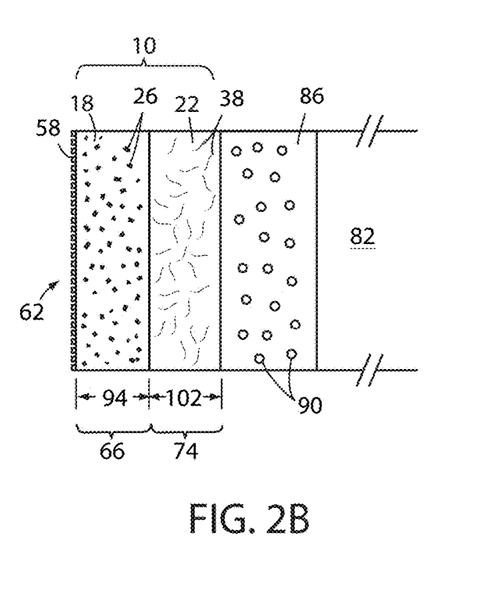
FIG. 2B is a schematic of an enlarged cross-section of the liner at region II marked in FIG. 1 including the first polymeric capping layer and the polymeric base layer according to some aspects of the present disclosure.
Figure 2C:
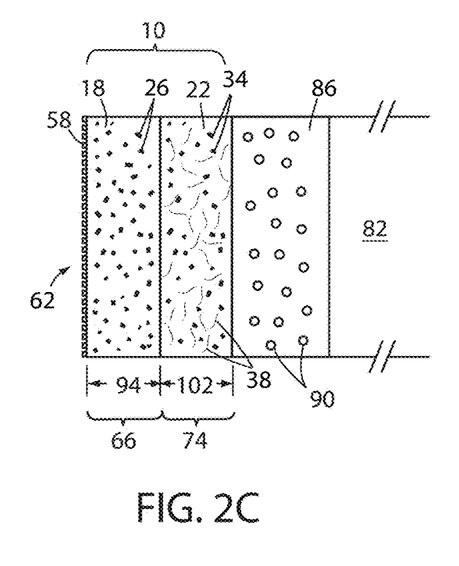
FIG. 2C is a schematic view of an enlarged cross-section of the liner at region II marked in FIG. 1 including the first polymeric capping layer and the polymeric base layer according to some aspects of the present disclosure.

Referring now to FIGS. 2B and 2C, in some aspects, the liner 10 may not include the barrier layer 42 and corresponding barrier region 70. The liner 10 without the barrier layer 42 includes the first polymeric capping layer 18 having the first pigment additive 26 evenly dispersed throughout. The first polymeric capping layer 18 may additionally include the outer surface 62 having the textured pattern 58 and an inner surface directly coupled or layered onto the polymeric base layer 22. The polymeric base layer 22 may be positioned directly onto the foam layer 86 having one or more pores 90 where the foam layer 86 is sandwiched directly between the polymeric base layer 22 and the wrapper and/or cabinet 82. In some examples, the base layer 22 may include the second pigment additive 34 dispersed throughout. The first pigment additive 26 and the second pigment additive 34 may be identical in composition and/or concentration. In examples where the first pigment additive 26 and the second pigment additive 34 are identical in composition, the presence of the first pigment additive 26 in the base layer 22 may be referred to as the second pigment additive 34 in an effort to distinguish or differentiate the locations of the respective pigment additives. In some examples, the base layer 22 may be provided with a lower concentration of the second pigment additive 34 than the concentration of the first pigment additive 26 that is provided in the first polymeric capping layer 18. In one specific example, the first polymeric capping layer 18 may be provided with a composition of 70% HIPS and 30% first pigment additive 26 while the base layer 22 is provided with a composition of 70% HIPS and 30% PE mixture, where the PE mixture has a composition of 96% PE and 4% second pigment additive 34. However, the present disclosure is not so limited. For example, the PE mixture may be provided with a composition that utilizes the second pigment additive 34 at a concentration of at least about 1%, at least about 5%, at least about 10%, at least about 15%, at least about 20%, at least about 25%, at least about 30%, and/or combinations or ranges thereof, with a balancing concentration of polyethylene (PE). It may be beneficial to provide the second pigment additive 34 in the base layer 22 at a concentration that is equal to, or generally corresponds with (e.g., within about 10%), the concentration of the first pigment additive 26 in the first polymeric capping layer 18. The first capping layer thickness 94 and base layer thickness 102 may include the same thickness values described herein. Advantages of not using the barrier layer 42 in the liner 10 can include a reduction in weight, a reduction in liner 10 thickness, and/or a simpler and more efficient manufacturing process.

Figure 2D:
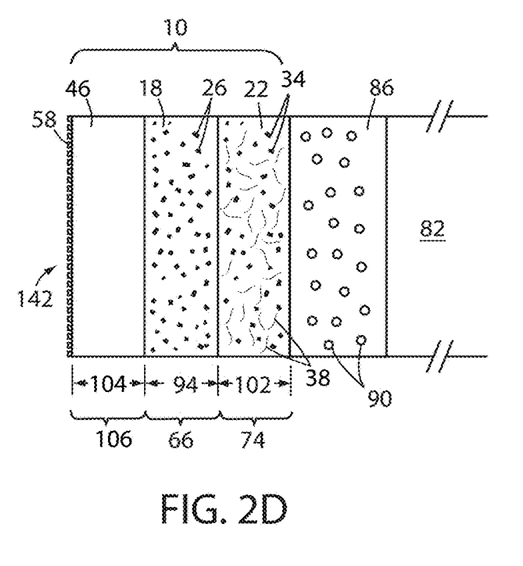
FIG. 2D is a schematic view of an enlarged cross-section of the liner at region II marked in FIG. 1 including the first polymeric capping layer, the polymeric base layer, and a second polymeric capping layer according to some aspects of the present disclosure.

Referring to FIG. 2D, the liner 10 is depicted with the second polymeric capping layer 46 and corresponding second capping region 104. The second polymeric capping layer 46 can be configured to have a thickness 106 (e.g., through extrusion, rolling, etc.) of about 0.10 mm to about 1.5 mm. In some aspects, the thickness 106 of the second polymeric capping layer 46 may range from about 0.25 mm to about 0.75 mm. Note that the thickness 106 of the second polymeric capping layer 46 is given in approximate dimensions, as would be typically associated with the second polymeric capping layer 46 being in a sheet or layer form before incorporation into the liner 10. The second polymeric capping layer 46 is coupled to the first polymeric capping layer 18 such that the first polymeric capping layer 18 is positioned between the polymeric base layer 22 and the second polymeric capping layer 46. The second polymeric capping layer 46 may include a high-impact polystyrene (HIPS), poly(methyl methacrylate) (PMMA), polystyrene (PS), acrylonitrile butadiene styrene (ABS), polyurethane (PU), polypropylene (PP), polyethylene (PE), or combinations thereof. In various examples, the second polymeric capping layer 46 is utilized as a scratch-resistant layer of the liner 10. In examples that employ the second polymeric capping layer 46, the textured pattern 58 may be formed on an outer surface 142 of the second polymeric capping layer 46.

Referring again to FIG. 2D, the polymeric base layer 22 of the liner 10 may include one or more pigment additives (e.g., second pigment additive 34), configured to impart color, tinting, or the like into the liner 10. As understood by those with ordinary skill in the field of the disclosure, various metallic, ceramic, and/or polymeric, pigments and/or colorants can be added at various concentrations within the polymeric base resin 54 in the process of making the polymeric base layer 22 of the liner 10. In some aspects, the second pigment additive 34 is a granulated pigment. For example, titanium oxide can be included as the second pigment additive 34 to achieve a white color. In other aspects, a charcoal-sparkle appearance can be imparted to the liner 10 by employing carbon black in one or more of quartz, mica, and stainless steel as the second pigment additive 34. In some aspects of the disclosure, the second pigment additive 34 is incorporated into the base region 74 of the liner 10 at a concentration level and disbursed to ensure that the liner 10 exhibits a particular color, hue, or the like, as desired by the user of the household appliance 14. In various aspects, the first pigment additive 26 may be incorporated into the first capping region 66 and the second pigment 34 may be incorporated into the base region 74 at concentrations sufficient for the liner 10 to obtain the desired color, hue, or tinting. In such aspects, the second pigment additive 34 may aid in retention of the desired color, hue, or tinting in the event of scratching, marring, or other aesthetic blemishes that may occur to the liner 10. Additionally or alternatively, the second pigment additive 34 may aid in blending the scratches, marring, or other aesthetic blemishes such that they are less noticeable by a user. According to some aspects, the second pigment additive 34 is incorporated into the base region 74 of the liner 10 at a concentration from about 1% to about 15% (by weight of the polymeric base layer 22). Optionally, the second pigment additive 34 may be incorporated into the base region 74 at a concentration from about 1% to about 10% (by weight of the polymeric base layer 22). In still other aspects, the concentration of the second pigment additive 34 in the polymeric base layer 22 may be from about 1% to about 5% (by weight of the base layer 22).

Referring further to FIG. 2D, in various examples, the one or more polymers 30 of the polymeric base layer 22 may include a high-impact polystyrene (HIPS), poly(methyl methacrylate) (PMMA), polystyrene (PS), acrylonitrile butadiene styrene (ABS), polyurethane (PU), polypropylene (PP), polyethylene (PE), or combinations thereof. For example, the one or more polymers 30 can include a colored polyethylene blend and a high-impact polystyrene. In such an example, the colored polyethylene blend may be present in the one or more polymers 30 at a concentration of about 1% by weight, about 5% by weight, about 10% by weight, about 15% by weight, about 20% by weight, about 25% by weight, about 30% by weight, about 35% by weight, about 40% by weight, about 45% by weight, about 50% by weight, and/or combinations or ranges thereof, with the high-impact polystyrene being provided at a balancing concentration (i.e., the two concentrations adding up to 100%) by weight of the one or more polymers 30. In one specific example, the colored polyethylene blend of the one or more polymers 30 includes the second pigment additive 34 at a concentration of about 4% by weight of the colored polyethylene blend with the balance of the colored polyethylene blend being made up of polyethylene (i.e., 96% polyethylene by weight of the colored polyethylene blend).

Referring still further to FIG. 2D, the concentration of the second pigment additive 34 within the one or more polymers 30 and the natural fiber 38 may be approximately equal, substantially equal, or equal. In some examples, the second pigment additive 34 may be added to the one or more polymers 30 and the natural fiber 38 separately, prior to mixing the one or more polymers 30 with the natural fiber 38. For example, the natural fiber 38 may be bleached and pre-colored with the second pigment additive 34 prior to mixing the natural fiber 38 with the one or more polymers 30. In such an example, the pre-coloring of the natural fiber 38 with the second pigment additive 34 may be carried out such that the second pigment additive 34 is present at about the same concentration in the natural fiber 38 as the concentration of the second pigment additive 34 within the one or more polymers 30. Accordingly, dilution effects of the second pigment additive 34 may be mitigated or eliminated such that the desired color, hue, or tinting of the liner 10 is maintained or substantially maintained. In various examples, the natural fiber 38 may be short-length fibers (e.g., 24 mm to 30.9 mm in length), long-length fiber (e.g., 31 mm or greater in length), or extra-long fibers (e.g., 33.4 mm or greater in length). While a given fiber may fall into a single category of short-length, long-length, or extra-long length, one of skill in the art will recognize that the natural fibers 38 within the polymeric base layer 22 may include fibers from one or more of the fiber length categories. The natural fibers 38 may be provided with a longitudinal spiral twist. The longitudinal spiral twist may provide a degree of elasticity to the natural fibers 38. For example, the degree of elasticity may be about 10% such that the natural fibers 38 may be extended from their relaxed length to an extended length that is about 10% greater than their relaxed length (e.g., by application of an external force). In various examples, the natural fibers 38 may be a cellulose-like fiber, a wood fiber, wood pulp, cotton-lint fiber, and/or combinations thereof.

Figure 3A:
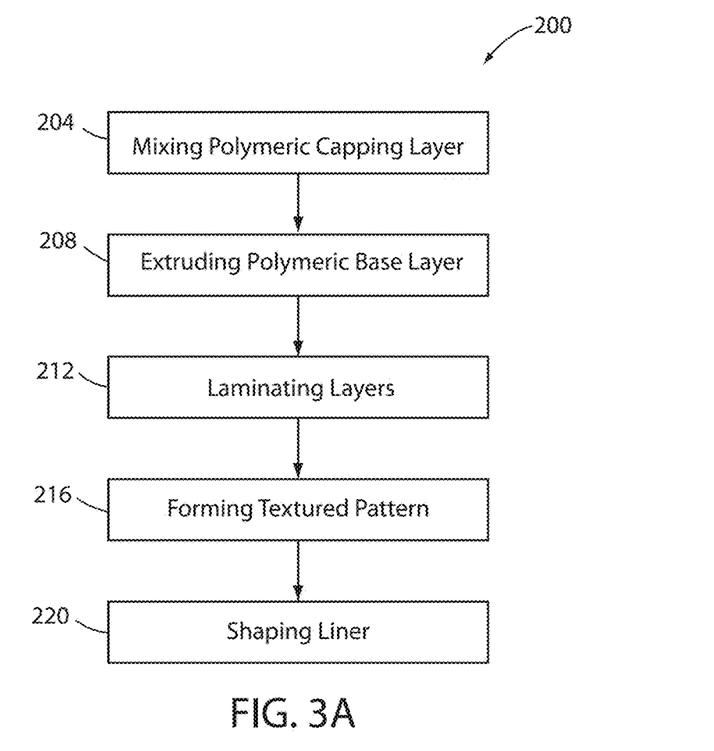
FIG. 3A is a flow-chart schematic of a method for making a liner for an appliance according to some aspects of the present disclosure.
Figure 3B:
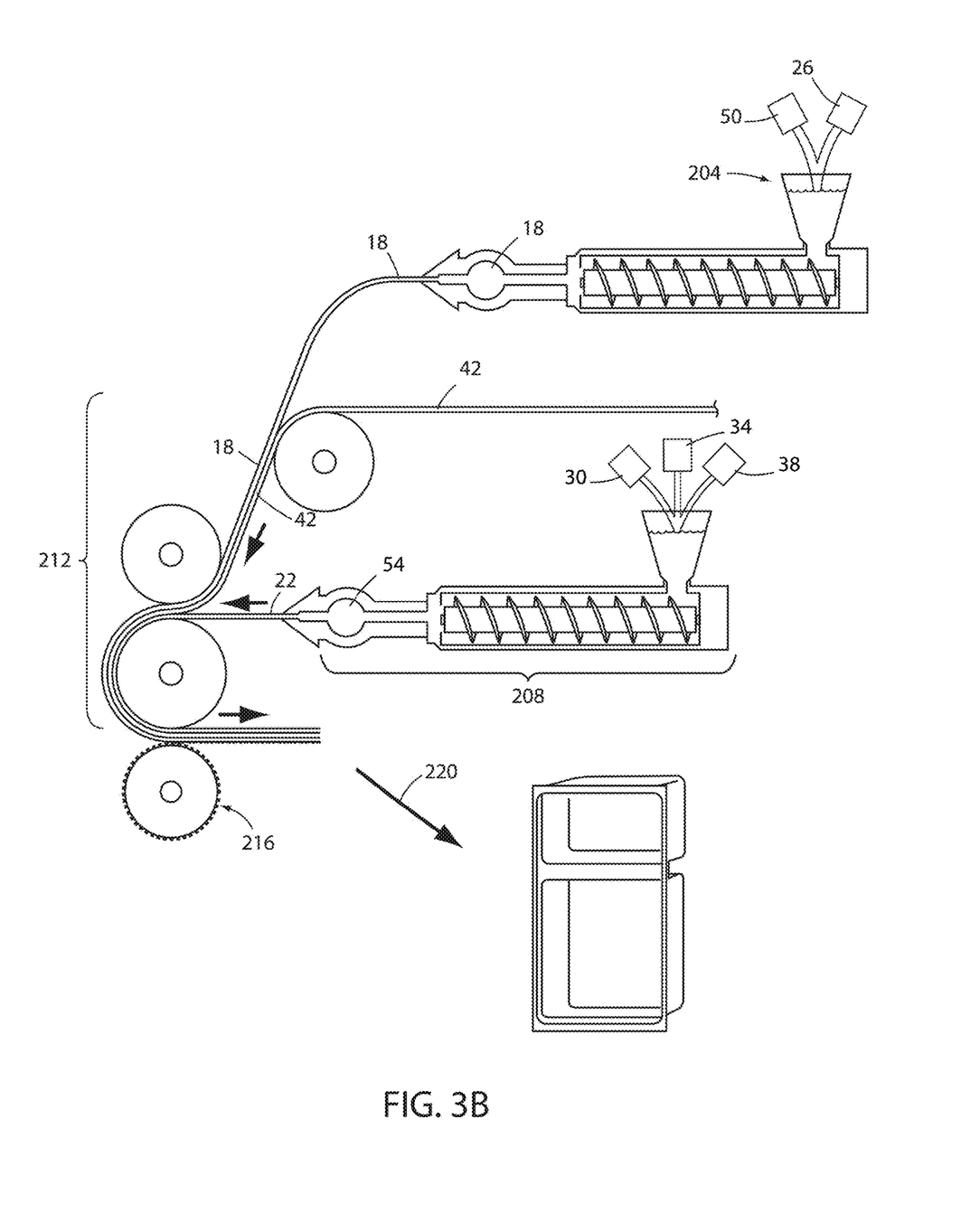
FIG. 3B is an illustrated schematic of the method for making a liner for an appliance according to some aspects of the present disclosure.

Referring now to FIGS. 3A and 3B, the method 200 of making the liner 10 for the household appliance 14 is depicted in schematic form. The method 200 includes mixing step 204 for mixing the first polymeric capping layer precursor 50 and the first pigment additive 26 to form the first polymeric capping layer 18. In some aspects, the mixing step 204 includes mixing the first polymeric capping layer precursor 50 with about 5% to about 30% first pigment additive 26 by weight or from about 15% to about 25% first pigment additive 26 by weight of the first polymeric capping layer 18. The mixing step 204, for example, can be conducted within an extruder or in a separate vessel or container. According to some aspects, the mixing step 204 is conducted such that the first polymeric capping layer precursor 50 and the first pigment additive 26 are mixed in particulate form. In some aspects, the mixing step 204 is conducted such that the first polymeric capping layer 18 exhibits a predetermined color. In some aspects, the first polymeric capping layer 18 includes the first polymeric capping layer precursor 50 from about 50% to about 98% by weight, from about 60% to about 95% by weight, from about 70% to about 95% by weight, or from about 75% to about 95% by weight of the first polymeric capping layer 18.

Referring again to FIGS. 3A and 3B, the method 200 of making the liner 10 for the household appliance 14 further includes extruding step 208 for forming the polymeric base layer 22. In some aspects, the extruding step 208 is conducted in an extruder suitable for extrusion of thermoplastic materials into polymeric layers. According to some aspects, the base layer formation temperature is set between about 120° F. to about 425° F., about 120° F. to about 160° F., from about 275° F. to about 400° F., or from about 290° F. to about 370° F. In other aspects, the extruding step 208 is conducted with other apparatuses to accomplish the same or similar function as would be understood by those with ordinary skill in the art, e.g., hot-pressing apparatus, injection molding apparatus, etc.

Still referring to FIGS. 3A and 3B, the method 200 of making the liner 10 of the household appliance 14 further includes laminating step 212 for laminating the first polymeric capping layer 18 and the polymeric base layer 22 to form the liner 10 at about the base layer formation temperature. In various examples, the barrier layer 42 may be laminated between the first polymeric capping layer 18 and the polymeric base layer 22 at the laminating step 212 to form the liner 10 at about the base layer formation temperature. In some examples, the second polymeric capping layer 46 may be laminated to the first polymeric capping layer 18 at the laminating step 212 to form the liner at about the base layer formation temperature. It is contemplated that any two or more of the layers discussed herein (e.g., the first polymeric capping layer 18, the polymeric base layer 22, the barrier layer 42, and/or the second polymeric capping layer 46) may be laminated to one another at the laminating step 212. According to some aspects of the disclosure, the laminating step 212 of the method 200 is conducted by using rollers, e.g. one or more calendaring rollers 118 (see FIGS. 4A and 4B). Accordingly, the laminating step 212 using rollers can involve rolling the first polymeric capping layer 18, the polymeric base layer 22, the barrier layer 42, and/or the second polymeric capping layer 46 together, at about the base layer formation temperature to form the liner 10. Depending upon the particular arrangement or number of layers of the liner 10, the laminating step 212 may be carried out in a plurality of sub-steps to build the liner 10. By rolling the layers together at about the same temperature in which they were extruded or otherwise processed in earlier steps, the laminating step 212 ensures that the layers are joined together with substantially no interfaces between them. In some aspects, the liner 10 can be characterized as a bilayer, a trilayer, or a quadlayer appearing as a monolayer having substantially no interfaces between the two, three, or four respective regions 66, 70, and/or 74. In some aspects, the lamination step 212 is conducted to form the liner 10 having substantially no interfaces between the first capping region 66, the barrier region 70, the base region 74, and/or the second capping region 104. In some aspects, the laminating step 212 is conducted such that the first polymeric capping layer 18 exhibits a predetermined color.

In some aspects, the lamination step 212 can be heated to about the base layer formation temperature, e.g., about 275° F. to about 400° F. That is, a temperature that is about the base layer formation temperature allows for efficient laminating of the respective layers 18, 22, 42, and/or 46. In some aspects, temperatures considered "about the base layer formation temperature" include temperatures less than or equal to 3° F., less than or equal to 5° F., less than or equal to 10° F., or less than or equal to 15° F. of the melting temperature of the polymeric base resin 54 or blend used. The pressure applied by the rollers 118 in the lamination step 212, and the fact that the rollers 118 are set to approximately the base layer formation temperature, ensures that the first polymeric capping layer 18, the base layer 22, the barrier layer 42, and/or the second polymeric capping layer 46 are merged together during the lamination step 212 to form the uniform liner 10.

Figure 5:
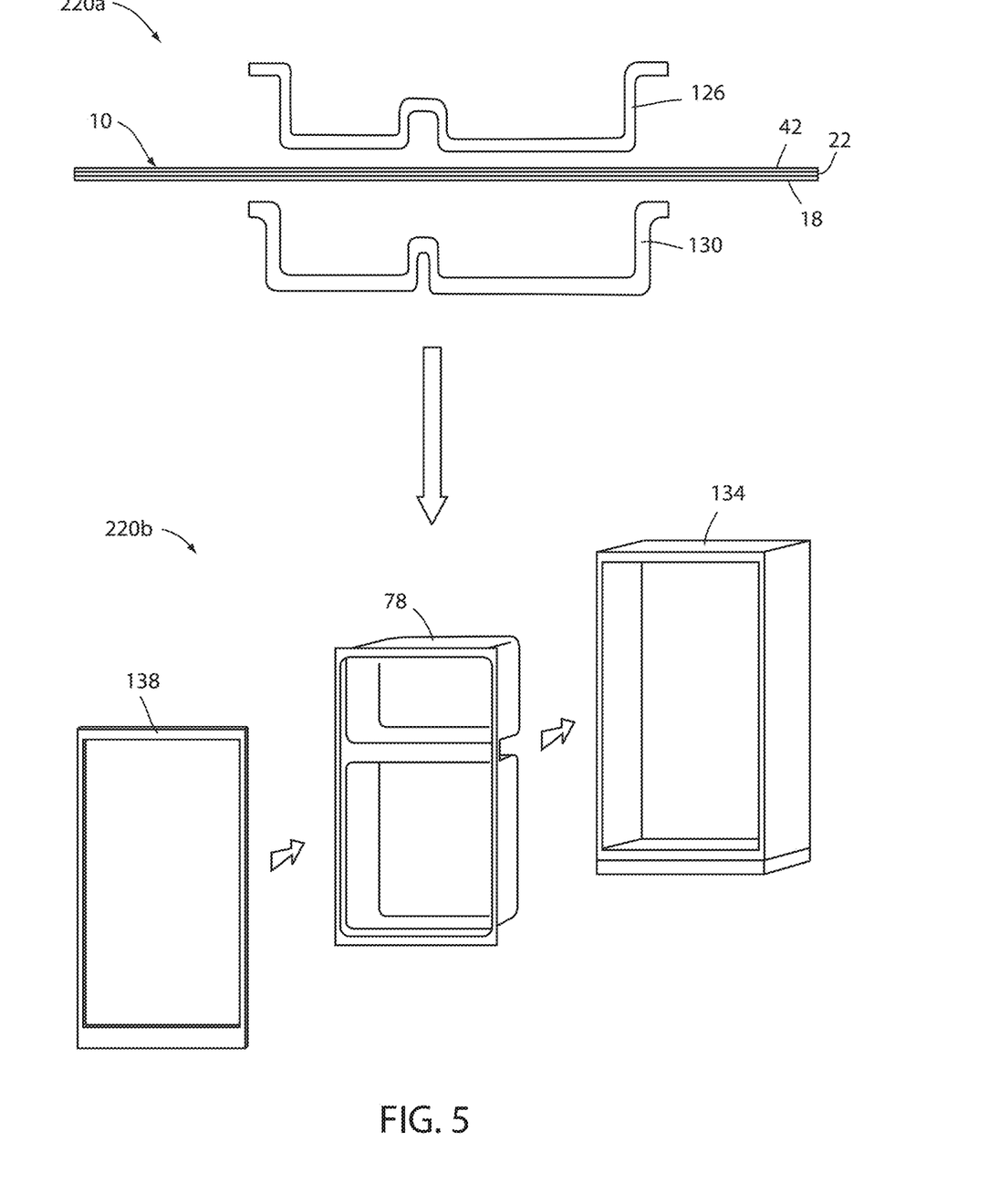
FIG. 5 is a schematic for shaping the liner into a final liner to be installed in the refrigeration appliance according to some aspects of the present disclosure.

Referring again to FIGS. 3A and 3B, the method 200 of making the liner 10 can include step 216 of forming the textured pattern 58 on the outer surface 62 of the first polymeric capping layer 18 or the outer surface 62 of the second polymeric capping layer 46. The method 200 of making the liner 10 can be conducted with a shaping step (step 220) after formation of the liner in steps 204, 208, 212, and optional step 216. In various examples, step 220 may include sub-steps 220a and 220b, as depicted in FIG. 5. As depicted in FIG. 5, the step 220 of method 200 can be conducted by shaping the liner 10 into a final liner 78 suitable for subsequent assembly into the household appliance 14 by using a shaping temperature. To impart a desired shape to the liner 10, the liner 10 may be heat pressed or compression molded between a heated top mold 126 and a heated bottom mold 130 (step 220a). The final liner 78 is formed to a desired shape/design and is configured for assembly into the household appliance 14 (e.g., the refrigeration household appliance 14 as shown in FIG. 1). In some aspects, the shaping step 220 is conducted according to a thermal-forming process, typically at a temperature that approaches, but does not exceed, the base layer formation temperature, employed in earlier steps of the method 200. In some aspects, the shaping temperature of the shaping step 220 may range between temperatures from about 200° F. to about 350° F.

Figure 4A:
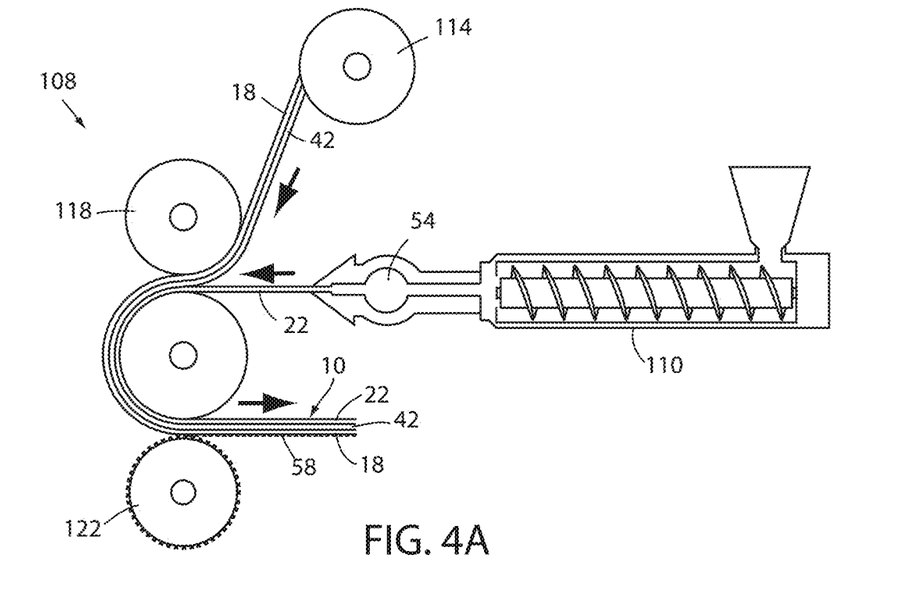
FIG. 4A is a schematic of a hot lamination process according to some aspects of the present disclosure.
Figure 4B:
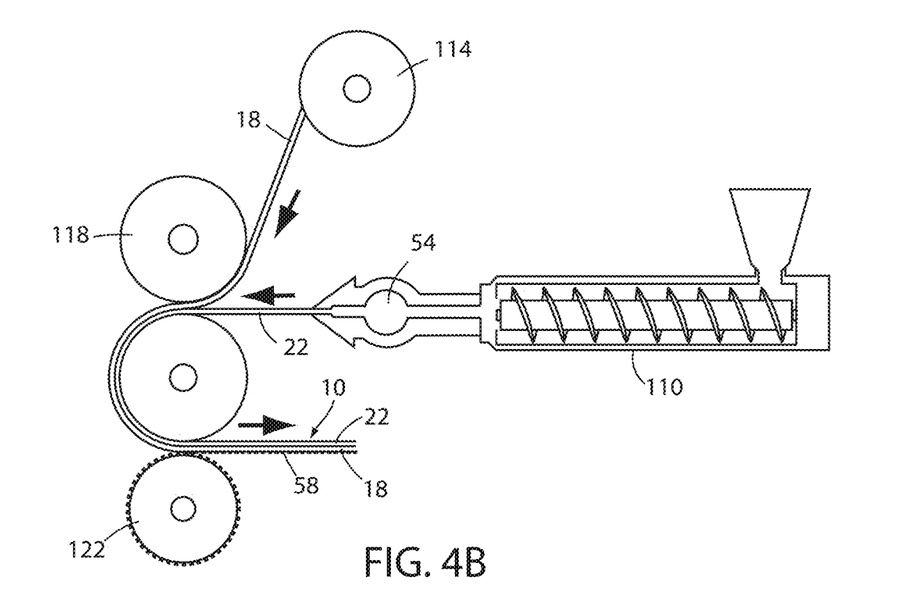
FIG. 4B is a schematic of a hot lamination process according to other aspects of the present disclosure.

Referring now to FIGS. 4A and 4B, in some aspects, the method 200 of making the liner 10 of the household appliance 14 may reduce energy usage and timing needs by directly extruding the polymeric base resin 54 and corresponding polymeric base layer 22 into a laminating assembly 108. In these aspects, as the polymeric base layer 22 is freshly formed using an extruder 110 where the polymeric base layer 22 is still hot from the extrusion and forming processes, the polymeric base layer 22 is directly positioned into the laminating assembly 108 contemporaneously with the first polymeric capping layer 18 while the barrier layer 42 and/or the second polymeric capping layer 46 may be loaded from a pulley roller 114 to be laminated into the liner 10 using one or more rollers 118. At least one of the advantages of laminating the freshly formed and still hot polymeric base layer 22 with the first polymeric capping layer 18 and barrier layer 42 is the ability to save energy from not having to heat each of the respective layers 18, 22, 42, and/or 46 to about the base layer formation temperature. Since the temperature of the polymeric base layer 22 is about the base layer formation temperature upon being formed, the polymeric base layer 22 may be readily laminated to the first polymeric capping layer 18, the barrier layer 42, and/or the second polymeric capping layer 46 to form the liner 10 with substantially no interfaces between the respective layers (see FIGS. 2A-2D). In some aspects, no barrier layer 42 may be incorporated and the polymeric base layer 22 may be readily and directly laminated to the first polymeric capping layer 18 to form the liner 10 with substantially no interfaces between the respective layers (see FIGS. 2B-2D). In some aspects, the second polymeric capping layer 46 may be readily and directly laminated to the first polymeric capping layer 18 before, during, or after lamination of the first polymeric capping layer 18 to the polymeric base layer 22. In some aspects, the base layer formation temperature may be from about 120° F. to about 160° F., from about 125° F. to about 350° F., from about 175° F. to about 325° F., or from about 200° F. to about 275° F. In some aspects, the base layer formation temperature is above the glass transition temperature for amorphous polymers or when the amorphous polymer begins to flow and/or above the melting point for crystalline polymers or when the crystalline polymer begins to flow.

Still referring to FIGS. 4A and 4B, the method 200 of making the liner 10 includes forming the textured pattern 58 on the outer surface 62 on the first polymeric capping layer 18 (step 216). In some aspects, the textured pattern 58 may be formed into the outer surface 62 on the first polymeric capping layer 18 or on the outer surface 142 of the second polymeric capping layer 46 using a granular pattern mold roller 122. Depending on the desired aesthetic and color appearance desired for the liner 10, the granular pattern mold roller 122 can be configured to impart or mold, for example, pyramidal, diamond, circular, trapezoidal, square, tetragonal, hexagonal, polygonal, or a combination of shapes thereof into the outer surface 62 of the first polymeric capping layer 18. In some aspects, the textured pattern 58 may include a 2D surface pattern, a 3D surface pattern, or a combination thereof. The added textured or granular pattern 58 helps maintain color, prevent visible markings, and/or prevent visible wear of the outer surface 62 of the liner 10 by offering an alternative to a glossy or smooth finished surface that readily can show marks or wear from the manufacturing process or normal wear.

Referring further to FIGS. 4A and 4B, in some aspects of the present disclosure, the liner 10 is provided with the first polymeric capping layer 18 and the base layer 22 while the barrier layer 42 is excluded. The polymeric base resin 54 used to form the polymeric base layer 22 may include a high-impact polystyrene (HIPS) precursor material, such as 1170 HIPS, the second pigment additive 34, a polyethylene (PE), and/or the natural fiber 38. For example, the base layer 22 may include a mixture of high-impact polystyrene (HIPS) and colored polyethylene (PE) blend that is present at a concentration of between about 1% to less than 50% by weight of the polymeric base layer 22. In some examples, the colored polyethylene blend is present at a concentration of between about 1% and about 30% by weight of the mixture of HIPS and colored PE blend, while the high-impact polystyrene is present at a concentration of between about 70% and about 99% by weight of the mixture of HIPS and colored PE blend. The colored PE blend can include the second pigment additive 34 at a concentration of between about 1% and about 25% by weight of the colored PE blend. In one specific example, the colored PE blend can include 96% by weight polyethylene and 4% by weight second pigment additive 34. In such an example, the colored PE blend (96/4 PE/pigment) is mixed with the HIPS material at a desired ratio to formulate the mixture of HIPS and colored PE blend (e.g., 30% colored PE blend and 70% HIPS). The natural fiber 38 and the mixture of HIPS and colored PE blend can be combined to formulate the polymeric base resin 54. In one specific example, the natural fiber 38 may be present at a concentration of about 55% by weight of the polymeric base layer 22 and the mixture of HIPS and colored PE blend may be present at a concentration of about 45% by weight of the polymer base layer 22. In various examples, the colored polyethylene (PE) blend may include a loading concentration of high-impact polystyrene (HIPS) and the second pigment additive 34. For example, the polyethylene (PE) mixture may include a loading concentration of high-impact polystyrene (HIPS) of at least about 2% HIPS, at least about 4% HIPS at least about 6% HIPS, at least about 8% HIPS, at least about 10% HIPS, at least about 12% HIPS, at least about 14% HIPS, at least about 16% HIPS, at least about 18% HIPS, at least about 20% HIPS, and/or combinations or ranges thereof. The first polymeric capping layer 18 may have a composition similar to those described herein, such as high-impact polystyrene (HIPS) with a loading concentration of the first pigment additive 26 (see FIG. 2B). For example, the first polymeric capping layer 18 may be made with a composition that includes high-impact polystyrene (HIPS) at a concentration in the range of at least about 70% to less than about 99% and a loading of the first pigment additive 26 of at least about 1% to less than about 30%.

Referring still further to FIGS. 4A and 4B, in some aspects of the present disclosure, the first polymeric capping layer 18 and the base layer 22 may each be provided with a pigment additive (e.g., the first pigment additive 26 or the second pigment additive 34) (see FIGS. 2C and 2D). As discussed above, the second pigment additive 34 may be identical in composition to the first pigment additive 26 in various examples. In such an example, the base layer 22 may be provided with a lower concentration of the first pigment additive 26 than the concentration that is provided in the first polymeric capping layer 18. In one specific example, the first polymeric capping layer 18 may be provided with a composition of 70% HIPS and 30% first pigment additive 26 while the base layer 22 is provided with a composition of 55% natural fiber 38 and 45% of a mixture of HIPS and colored PE blend. In this specific example, the HIPS and colored PE blend includes 70% HIPS and 30% colored PE blend, where the colored PE blend has a composition of 96% PE and 4% first pigment additive 26. However, the present disclosure is not so limited. For example, the PE mixture may be provided with a composition that utilizes the first pigment additive 26 at a concentration of at least about 1%, at least about 5%, at least about 10%, at least about 15%, at least about 20%, at least about 25%, at least about 30%, and/or combinations or ranges thereof, with a balancing concentration of polyethylene (PE). It may be beneficial to provide the first pigment additive 26 in the base layer 22 at a concentration that is equal to, or generally corresponds with (e.g., within about 10%), the concentration of the first pigment additive 26 in the first polymeric capping layer 18.

The first polymeric capping layer 18 may be provided with any of the compositions disclosed herein, including combinations thereof, without departing from the concepts disclosed herein. Additionally, the base layer 22 may be provided with any one of the compositions disclosed herein or combinations thereof. Further, the base layer 22 may be provided with a composition that is a hybrid of the compositions disclosed herein for the first polymeric capping layer 18, the base layer 22, and/or the barrier layer 42. By providing the base layer 22 with the first pigment additive 26, in the event of defects or deformations to the liner 10, the defects or deformations may be at least partially blended with the surrounding area such that the defect or deformation remains hidden or barely perceptible to the user.

One function of the barrier layer 42, is to protect the first polymeric capping layer 18 from defects and deformations that result from the foam layer 86 attacking or degrading the base layer 22. The foam layer 86, in some instances, can penetrate through the base layer 22 and interact directly with the barrier layer 42. In the bilayer examples disclosed herein, the barrier layer 42 is omitted. Similarly, in some of the trilayer examples disclosed herein, the barrier layer 42 is omitted. Accordingly, the foam layer 86 may pose a greater threat to the integrity of the first polymeric capping layer 18 if the foam layer 86 is allowed to interact with the first polymeric capping layer 18. Therefore, the formulation of the base layer 22 in its various aspects and examples has been designed as a hybrid composition that may be provided with characteristics of both the base layer 22 and the barrier layer 42 while remaining a uniform composition. By adjusting the composition of the base layer 22, the foam layer 86 is not permitted to reduce the thickness of the liner 10. Instead, the base layer 22 immediately resists degradation of the liner 10 by the foam layer 86. An additional advantage of the liners 10 that omit the barrier layer 42 is that the first polymeric capping layer 18 and the base layer 22 are more suitable for regrinding of scrap material such that manufacturing costs are reduced. In addition to significant manufacturing cost savings by opening the possibility for regrinding of scrap material, it may be beneficial to laminate fewer layers from a manufacturing costs and complexity standpoint. By laminating fewer layers together, fewer opportunities exist for defects, deformations, and imperfections in the liner 10. For example, laminating a third layer onto a bilayer can result in deformations in not only the junction between the third layer and the bilayer, but also can result in a disruption in the junction between first and second layers that have already been laminated into the bilayer. The use of fewer layers and the hybrid composition for the base layer 22 are able to decrease cost and waste while maintaining or improving a lifecycle of the liner 10, which ultimately can decrease costs associated with recalls and/or warranty repairs. The hybrid composition of the base layer 22 prevents deformation, defects, and general depolymerization or dissolving of the base layer 22 that can result from insulating foams that are often utilized in the household appliance 14. Accordingly, the hybrid composition of the base layer 22 can reduce or eliminate the drawbacks of utilizing a separate barrier layer 42 while maintaining the benefits provided by the barrier layer 42.

Liner 10 structures that employ the barrier layer 42 may be provided with compositions that include a mixture of polyethylene (PE) and polyethylene terephthalate (PET). For example, the barrier layer 42 may be provided with a composition of 90% PE (e.g., 1170 HIPS) and 10% PET. While the incorporation of the barrier layer 42 helps to protect against wrinkling and other deformations, the barrier layer 42 can introduce difficulties with manufacturing, costs, and performance of the liner 10. For example, the barrier layer 42 is often blended and produced as a separate layer for the structures that employ the barrier layer 42, which increases costs, and the barrier layer 42 is often difficult or impossible to regrind when issues arise. When polyethylene terephthalate (PET) is present in the barrier layer 42, and the scrap barrier layer 42 is mixed with the first polymeric capping layer 18 and/or the base layer 22 for remanufacturing, then serious issues arise with thermoforming and color matching of the liner 10.

Referring to FIG. 5, the final liner 78 may be assembled with a wrapper 134 (e.g. the cabinet 82 as shown in FIG. 1) and a trim breaker 138 to form an insulation structure (step 220b). The insulation structure may then be filled with the foam layer 86 or other insulative material known in the art to form the fully insulated cabinet 82 structure.

The method 200 of making liners 10 and their corresponding bilayer, trilayer, or quadlayer structures result in liners 10 having better surface properties to prevent scratching or other visible aberrations of the color and/or texture. For example, the barrier layer 42 in combination with the textured pattern 58 positioned on the outer surface 62 or outer surface 142 of the liner 10 hides visible scratches or markings on the liner 10. The ability to position the first pigment additive 26 and the first polymeric capping layer 18 on one side of the liner 10 with the textured pattern 58 positioned on the outer surface 62 or the outer surface 142 of the liner 10 prevents the imparted color, tinting, hue or the like from visibly showing damage during the manufacturing or end use of the household appliance 14.

It is understood that the descriptions outlining and teaching the method of making the liner 10 previously discussed, which can be used in any combination, apply equally well to the liner 10 for the household appliance 14. Accordingly, the liner 10 includes a polymeric liner having the bilayer, trilayer, or quadlayer structure where the bilayer, trilayer, or quadlayer structure includes: the first polymeric capping layer 18 including a high-impact polystyrene material and the first pigment additive 26 wherein the outer surface 62 of the first polymeric capping layer 18 may include the textured pattern 58; the polymeric base layer 22 including a high-impact polystyrene material, the natural fiber 38, and optionally the second pigment additive 34; in some examples, the barrier layer 42 including a polyethylene material wherein the barrier region 70 is disposed between the first polymeric capping layer 18 and the polymeric base layer 22; and in various examples, the second polymeric capping layer 46 including a poly(methyl methacrylate) material wherein the second polymeric capping layer 46 is disposed upon the first polymeric capping layer 18 such that the first polymeric capping layer 18 is positioned between the polymeric base layer 22 and the second polymeric capping layer 46. The first polymeric capping layer 18, the polymeric base layer 22, the barrier layer 42, and/or the second polymeric capping layer 46 are directly coupled with substantially no interfaces between them in the structure. The first polymeric capping layer 18 and the polymeric base layer 22 are directly coupled with substantially no interfaces between them in the bilayer structure.

According to another aspect of the present disclosure, a household appliance liner includes a first polymeric capping layer and a polymeric base layer. The first polymeric capping layer includes a first pigment additive. The polymeric base layer is coupled to the first polymeric capping layer. The polymeric base layer includes one or more polymers, a second pigment additive, and a natural fiber. The natural fiber is present at a concentration of at least 50% by weight of the polymeric base layer.

According to another aspect of the present disclosure, a household appliance liner includes a second polymeric capping layer coupled to a first polymeric capping layer such that the first polymeric capping layer is positioned between a polymeric base layer and the second polymeric capping layer.

According to another aspect of the present disclosure, a household appliance liner includes a second polymeric capping layer that is a scratch-resistant layer.

According to another aspect of the present disclosure, a household appliance liner includes a second polymeric capping layer that includes poly(methyl methacrylate).

According to another aspect of the present disclosure, a household appliance liner includes a first pigment additive in a first polymeric capping layer, where the first pigment additive is present at a concentration of about 5% to about 30% by weight of the first polymeric capping layer.

According to another aspect of the present disclosure, a household appliance liner includes a first polymeric capping layer that includes a first polymeric capping layer precursor at a concentration of about 70% to about 95% by weight of the first polymeric capping layer.

According to another aspect of the present disclosure, a household appliance liner includes a second pigment additive that is present in a polymeric base layer at a concentration of about 1% to about 30% by weight of the polymeric base layer.

According to another aspect of the present disclosure a household appliance liner includes a polymeric base layer that includes one or more polymers, where the one or more polymers include a colored polyethylene blend and a high-impact polystyrene.

According to another aspect of the present disclosure, a household appliance liner includes a colored polyethylene blend with a second pigment additive, where the second pigment additive is present at a concentration of about 4% by weight of the colored polyethylene blend, and wherein the colored polyethylene blend includes polyethylene at a concentration of about 96% by weight of the colored polyethylene blend.

According to another aspect of the present disclosure, a household appliance liner includes one or more polymers, where the one or more polymers include a colored polyethylene blend that is present at a concentration of about 30% by weight of one or more polymers and a high-impact polystyrene that is present at a concentration of about 70% by weight of the one or more polymers.

According to another aspect of the present disclosure, a household appliance liner includes a polymeric base layer that includes one or more polymers and a natural fiber, where the polymeric base layer includes a concentration of a second pigment additive that is about equal within the one or more polymers and the natural fiber.

According to another aspect of the present disclosure, a household appliance liner includes a natural fiber that is bleached and pre-colored with a second pigment additive prior to mixing the natural fiber with one or more polymers.

According to another aspect of the present disclosure, a household appliance liner includes a second pigment additive that is added to one or more polymers and a natural fiber in equal amounts prior to mixing the one or more polymers and the natural fiber.

According to another aspect of the present disclosure, a household appliance liner includes a barrier layer that is coupled to a polymeric base layer such that the barrier layer is positioned between a first polymeric capping layer and the polymeric base layer.

According to another aspect of the present disclosure, a household appliance liner includes a first polymeric capping layer and a polymeric base layer. The first polymeric capping layer includes a first pigment additive and a first polymeric capping layer precursor. The first pigment additive is present at a concentration of about 5% to about 30% by weight of the first polymeric capping layer. The first polymeric capping layer precursor is present at a concentration of about 70% to about 95% by weight of the first polymeric capping layer. The polymeric base layer is coupled to the first polymeric capping layer. The polymeric base layer includes one or more polymers, a second pigment additive, and a natural fiber. The second pigment additive is present in the polymeric base layer at a concentration of about 1% to about 30% by weight of the polymeric base layer. The natural fiber is present at a concentration of at least 50% by weight of the polymeric base layer.

According to another aspect of the present disclosure, a household appliance liner includes one or more polymers present within a polymeric base layer. The one or more polymers include a colored polyethylene blend and a high-impact polystyrene. The colored polyethylene blend includes a second pigment additive at a concentration of about 4% by weight of the colored polyethylene blend. The colored polyethylene blend includes polyethylene at a concentration of about 96% by weight of the colored polyethylene blend.

According to another aspect of the present disclosure, a household appliance liner includes one or more polymers. The one or more polymers include a colored polyethylene blend is present at a concentration of about 30% by weight of the one or more polymers and the high-impact polystyrene that is present at a concentration of about 70% by weight of the one or more polymers.

According to another aspect of the present disclosure, a method of making a liner for a household appliance is disclosed. The method includes mixing a first polymeric capping layer precursor and a first pigment additive to form a first polymeric capping layer, where the first pigment additive is present at a concentration of about 5% to about 30% by weight of the first polymeric capping layer; mixing one or more polymers, a second pigment additive, and a natural fiber to form a polymeric base resin; extruding the polymeric base resin to form a polymeric base layer at a base layer formation temperature, where the second pigment additive is present in the polymeric base layer at a concentration of about 1% to about 30% by weight of the polymeric base layer, and where the natural fiber is present at a concentration of at least 50% by weight of the polymeric base layer; and laminating the polymeric base layer and the first polymeric capping layer to form the liner at about the base layer formation temperature.

According to another aspect of the present disclosure a method of making a liner for a household appliance includes mixing a second pigment additive with one or more polymers and a natural fiber in equal amounts prior to mixing the one or more polymers and the natural fiber together.

According to another aspect of the present disclosure, a method of making a liner for a household appliance includes bleaching a natural fiber and pre-coloring the natural fiber with a second pigment additive. The bleaching and pre-coloring of the natural fiber may occur prior to mixing the natural fiber with one or more polymers.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A household appliance liner, comprising:
a first polymeric capping layer comprising a first pigment additive; and
a polymeric base layer coupled to the first polymeric capping layer, the polymeric base layer comprising:
one or more polymers;
a second pigment additive; and
a natural cellulose-like fiber, the natural cellulose-like fiber being present at a concentration of at least 50% by weight of the polymeric base layer, wherein the natural cellulose-like fiber is at least one of, a wood pulp, and a cotton-lint fiber, and wherein the natural cellulose-like fiber is bleached and pre-colored with the second pigment additive prior to mixing the natural cellulose-like fiber with the one or more polymers.

2. The household appliance liner of claim 1, further comprising:
a second polymeric capping layer coupled to the first polymeric capping layer such that the first polymeric capping layer is positioned between the polymeric base layer and the second polymeric capping layer.

3. The household appliance liner of claim 2, wherein the second polymeric capping layer is a scratch-resistant layer.

4. The household appliance liner of claim 3, wherein the second polymeric capping layer comprises poly(methyl methacrylate).

5. The household appliance liner of claim 1, wherein the first pigment additive in the first polymeric capping layer is present at a concentration of about 5% to about 30% by weight of the first polymeric capping layer.

6. The household appliance liner of claim 5, wherein the first polymeric capping layer is formed from a first polymeric capping layer precursor at a concentration of about 70% to about 95% by weight of the first polymeric capping layer.

7. The household appliance liner of claim 1, wherein the second pigment additive is present in the polymeric base layer at a concentration of about 1% to about 30% by weight of the polymeric base layer.

8. The household appliance liner of claim 7, wherein the one or more polymers of the polymeric base layer comprises a colored polyethylene blend and a high-impact polystyrene.

9. The household appliance liner of claim 8, wherein the colored polyethylene blend comprises the second pigment additive at a concentration of about 4% by weight of the colored polyethylene blend, and wherein the colored polyethylene blend comprises polyethylene at a concentration of about 96% by weight of the colored polyethylene blend.

10. The household appliance liner of claim 8, wherein the colored polyethylene blend is present at a concentration of about 30% by weight of the one or more polymers and the high-impact polystyrene is present at a concentration of about 70% by weight of the one or more polymers.

11. The household appliance liner of claim 7, wherein the concentration of the second pigment additive in the polymeric base layer is about equal to a concentration of the second pigment additive in the one or more polymers and a concentration of the second pigment additive in the natural fiber.

12. The household appliance liner of claim 11, wherein the second pigment additive is added in equal amounts to the one or more polymers and the natural fiber prior to mixing the one or more polymers and the natural fiber.

13. The household appliance liner of claim 1, further comprising:
a barrier layer coupled to the polymeric base layer such that the barrier layer is positioned between the first polymeric capping layer and the polymeric base layer.

14. A household appliance liner, comprising:
a first polymeric capping layer formed from:
a first pigment additive, wherein the first pigment additive is present at a concentration of about 5% to about 30% by weight of the first polymeric capping layer; and
a first polymeric capping layer precursor at a concentration of about 70% to about 95% by weight of the first polymeric capping layer; and
a polymeric base layer coupled to the first polymeric capping layer, the polymeric base layer comprising:
one or more polymers;
a second pigment additive, wherein the second pigment additive is present in the polymeric base layer at a concentration of about 1% to about 30% by weight of the polymeric base layer; and
a natural cellulose-like fiber, the natural cellulose-like fiber being present at a concentration of at least 50% by weight of the polymeric base layer, wherein the natural cellulose-like fiber is a cotton-lint fiber.

15. The household appliance liner of claim 14, wherein the one or more polymers of the polymeric base layer comprises a colored polyethylene blend and a high-impact polystyrene, wherein the colored polyethylene blend comprises the second pigment additive at a concentration of about 4% by weight of the colored polyethylene blend, and wherein the colored polyethylene blend comprises polyethylene at a concentration of about 96% by weight of the colored polyethylene blend.

16. The household appliance liner of claim 15, wherein the colored polyethylene blend is present at a concentration of about 30% by weight of the one or more polymers and the high-impact polystyrene is present at a concentration of about 70% by weight of the one or more polymers.

17. The household appliance liner of claim 14, wherein the natural cellulose-like fiber is bleached and pre-colored with the second pigment additive prior to mixing the natural cellulose-like fiber with the one or more polymers.

18. The household appliance liner of claim 14, wherein the concentration of the second pigment additive in the polymeric base layer is about equal to a concentration of the second pigment additive in the one or more polymers and a concentration of the second pigment additive in the natural cellulose-like fiber.

* * * * *